US010348758B1

(12) United States Patent
Holl et al.

(10) Patent No.: US 10,348,758 B1
(45) Date of Patent: Jul. 9, 2019

(54) SYSTEMS AND METHODS FOR PROVIDING INTERFACES FOR VISUALIZING THREATS WITHIN NETWORKED CONTROL SYSTEMS

(71) Applicant: Symantec Corporation, Mountain View, CA (US)

(72) Inventors: Timothy Holl, Sunnyvale, CA (US); Michael Stanley, Mountain View, CA (US); Russell Bauder, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 350 days.

(21) Appl. No.: 15/368,542

(22) Filed: Dec. 2, 2016

(51) Int. Cl.
  *H04L 29/06* (2006.01)
  *H04L 29/08* (2006.01)
  *G06F 3/0482* (2013.01)

(52) U.S. Cl.
  CPC ........ *H04L 63/1433* (2013.01); *G06F 3/0482* (2013.01); *H04L 67/10* (2013.01)

(58) Field of Classification Search
  CPC .... H04L 63/1433; H04L 3/0482; H04L 67/10
  See application file for complete search history.

(56) References Cited

U.S. PATENT DOCUMENTS

| | | | | |
|---|---|---|---|---|
| 6,975,330 B1* | 12/2005 | Charlton | ............... | H04L 43/045 345/593 |
| 7,667,701 B2* | 2/2010 | Leah | ..................... | G06T 11/206 345/440 |
| 8,132,260 B1* | 3/2012 | Mayer | ................... | G06F 21/577 726/11 |
| 8,184,540 B1* | 5/2012 | Perla | ..................... | H04L 47/568 370/235 |
| D803,247 S | 11/2017 | Mistry et al. | | |
| 9,942,259 B2* | 4/2018 | Madhu | ................. | G06Q 50/265 |

(Continued)

OTHER PUBLICATIONS

Deepti Sawant Deori, et al; Systems and Methods for Data Visualization; U.S. Appl. No. 15/231,732, filed Aug. 8, 2016.

(Continued)

*Primary Examiner* — Jason K Gee
*Assistant Examiner* — Shu Chun Gao
(74) *Attorney, Agent, or Firm* — FisherBroyles, LLP

(57) ABSTRACT

The disclosed computer-implemented method for providing interfaces for visualizing threats within networked control systems may include (i) receiving a request to provide a graphical interface to visualize a networked control system with multiple components, (ii) identifying within the networked control system a potential security threat involving a potentially compromised component of the networked control system, and (iii) providing the graphical interface by (a) ordering the components according to a control hierarchy, (b) portraying each component within a circular area by arranging the components according to the control hierarchy and according to domains within the networked control system such that each component falling within a given domain is placed within a corresponding arc of the circular area, and (c) highlighting, within the graphical interface, an area within an arc of the circular area containing the potentially compromised component. Various other methods, systems, and computer-readable media are also disclosed.

20 Claims, 8 Drawing Sheets

(56) References Cited

U.S. PATENT DOCUMENTS

| | | | | |
|---|---|---|---|---|
| 10,158,652 | B2* | 12/2018 | Muddu | H04L 63/1416 |
| 2007/0140131 | A1* | 6/2007 | Malloy | H04L 43/026 |
| | | | | 370/241 |
| 2007/0188494 | A1* | 8/2007 | Agutter | G06F 17/30554 |
| | | | | 345/440 |
| 2007/0294187 | A1* | 12/2007 | Scherrer | G06Q 20/401 |
| | | | | 705/75 |
| 2009/0077666 | A1* | 3/2009 | Chen | G06F 21/577 |
| | | | | 726/25 |
| 2016/0164905 | A1* | 6/2016 | Pinney Wood | G06F 17/30958 |
| | | | | 726/25 |
| 2016/0301705 | A1* | 10/2016 | Higbee | G06F 16/35 |
| 2017/0063894 | A1* | 3/2017 | Muddu | H04L 63/1425 |
| 2017/0214701 | A1* | 7/2017 | Hasan | H04L 63/1408 |
| 2017/0272454 | A1* | 9/2017 | Seo, II | H04L 1/203 |

OTHER PUBLICATIONS

Deepti Sawant Deori; Display Screen with Graphical User Interface; U.S. Appl. No. 29/569,716, filed Jun. 29, 2016.

Big Data Visualizations: A Good Use of the Chord; https://web.archive.org/web/20150114081210/http://kromerbigdata.com/2013/11/25/big-data-visualizations-a-good-use-of-the-chord/comment-page-1/; as accessed on Jun. 15, 2016.

5 Absolutely Stunning Big-Data Visualizations; http://www.customerintelligence360.com/5-absolutely-stunning-big-data-visualizations/; as accessed on Jun. 15, 2016.

Biggs-Smith Graph; https://en.wikipedia.org/wiki/Biggs%E2%80%93Smith_graph; as accessed on Jun. 15, 2016.

Cybermap; https://cybermap.kaspersky.com; as accessed on Jun. 15, 2016.

Spotlight: Threat Visualizations; http://www.softwareadvice.com/security/spotlight/threat-visualizations-2014/; as accessed on Jun. 15, 2016.

Visualizing OSX Threat Internet Distribution; http://secviz.org/content/visualizing-os-x-threat-internet-distribution; as accessed on Jun. 15, 2016.

Application Usage & Threat Report; http://researchcenter.paloaltonetworks.com/app-usage-risk-report-visualization/#; as accessed on Jun. 15, 2016.

Draw Deeper Insights; https://quid.com/; as accessed on Jun. 15, 2016.

Enterprise Trend Visualization and the Potential of OSINT; http://blogs.csc.com/2015/02/17/enterprise-trend/visualization-and-the-potential-of-osinti; as accessed on Jun. 15, 2016; Feb. 17, 2015.

Understanding Link Analysis From the Analytic Workshop; http://linkanalysisnow.com/2011/07/using-visual-analysis-for-network.html; as accessed on Jun. 15, 2016.

Pravail; https://www.pravail.com/; as accessed on Jun. 15, 2016.

6 ways big data is helping reinvent enterprise security; https://gigaom.com/2012/11/15/6-ways-big-data-is-helping-reinvent-enterprise-security/; as accessed on Jun. 15, 2016.

Multi-Touch Visualization Reveals the Max Planck Research Network; http://infosthetics.com/archives/2011/09/multi-touch_visualization_reveals_max_planck_research_networks.html; as accessed on Jun. 15, 2016; Sep. 12, 2011.

Max Planck Research Networks; http://max-planck-research-networks.net/; as accessed on Jun. 15, 2016.

Using NVivo: An Unofficial and Unauthorized Primer; http://scalar.usc.edu/works/using-nvivo-an-unofficial-and-unauthorized-primer/types-of-data-visualizations-in-nvivo; as accessed on Jun. 15, 2016.

Bottlenose; https://bottlenose.com/products; as accessed on Jun. 15, 2016.

Ch. 11: Information Visualization for Text Analysis; http://searchuserinterfaces.com/book/sui_ch11_text_analysis_visualization.html; as accessed on Jun. 15, 2016.

Visualization—Big Data—Analytics—BlackHat US Workshop; http://raffy.ch/blog/category/log-analysis/; as accessed on Jun. 15, 2016.

Visualization of the Week: Clustering your social graph; http://radar.oreilly.com/2012/04/facebook-visualization-app-friends-experiences.html; as accessed on Jun. 15, 2016; Apr. 6, 2012.

Visualize your LinkedIn network with InMaps; https://blog.linkedin.com/2011/01/24/linkedin-inmaps; as accessed on Jun. 15, 2016; Jan. 24, 2011.

Why Visualization Matters in CRM; http://blog.pipelinersales.com/sales-effectiveness/why-visualization-matters-in-crm/; as accessed on Jun. 15, 2016; Jan. 26, 2015.

Capano et al.; Techniques for Presenting Information on a Graphical User Interface; U.S. Appl. No. 14/219,573, filed Mar. 19, 2014.

Capano et al.; Techniques for Presenting Information on a Graphical User Interface; U.S. Appl. No. 14/219,584, filed Mar. 19, 2014.

Capano et al.; Transitional Graphical User Interface for a Display Screen or a Portion Thereof; U.S. Appl. No. 29/485,487, filed Mar. 19, 2014.

Timothy Holl; Display Screen With Graphical User Interface; U.S. Appl. No. 29/586,413, filed Dec. 2, 2016.

NexDefense; http://www.nexdefense.com/, as retrieved on Dec. 7, 2016.

Darktrace; http://www.darktrace.com/, as retrieved on Dec. 7, 2016.

CyberX; http://cyberx-labs.com/en/home/, as retrieved on Dec. 7, 2016.

* cited by examiner

SYSTEMS AND METHODS FOR PROVIDING INTERFACES FOR VISUALIZING THREATS WITHIN NETWORKED CONTROL SYSTEMS

BACKGROUND

In the digital era, large-scale processes have become increasingly reliant on computer-directed automation and management systems, sometimes referred to as "control systems." These control systems may coordinate anything from infrastructure processes (including, e.g., the activities of electrical grids, water supply networks, and energy pipelines) to industrial processes (e.g., manufacturing) to facility control processes (e.g., the activities of systems in large buildings, transport hubs, etc.). Monitoring and directing processes on such a large scale may involve a large network of digital devices programmed to automatically coordinate, monitor, manage, and regulate various processes and sub-processes.

Unfortunately, the power and flexibility of modern control systems may also present a vulnerability. Malicious attackers may target control systems and/or devices within control systems, whether in cyberwarfare efforts directed to disrupting critical infrastructure, in industrial espionage, or simply to gain control of individual systems for ends unrelated to the task of the control system. Security failures in these systems may carry grave implications for human safety, the integrity of physical systems, and/or economic stability.

The instant disclosure, therefore, identifies and addresses a need for systems and methods for providing interfaces for visualizing threats within networked control systems.

SUMMARY

As will be described in greater detail below, the instant disclosure describes various systems and methods for providing interfaces for visualizing threats within networked control systems.

In one example, a computer-implemented method for providing interfaces for visualizing threats within networked control systems may include (i) receiving a request to provide a graphical interface to visualize a networked control system that includes a group of components, (ii) identifying within the networked control system at least one potential security threat involving at least one potentially compromised component of the networked control system, and (iii) providing the graphical interface in response to the request by (a) ordering the components according to a control hierarchy, (b) portraying each component within the components within a circular area within the graphical interface, where representing each component within the circular area includes (A) arranging the components according to the control hierarchy such that, for each parent-child pair of components within the hierarchy, a parent component of the parent-child pair is placed closer to a center of the circular area than a child component of the parent-child pair and (B) arranging the components according to a group of domains within the networked control system such that each component falling within a given domain is placed within a corresponding arc of the circular area, and (c) highlighting, within the graphical interface, an area within an arc of the circular area containing the potentially compromised component based at least in part on identifying the potential security threat involving the potentially compromised component.

In some examples, highlighting the area within the arc of the circular area may include highlighting the arc with a color.

In some examples, highlighting the area within the arc with a color may include selecting the color based on a collective threat level within a domain of the control hierarchy corresponding to the arc.

In some examples, highlighting the area within the arc of the circular area may include highlighting a representation of the potentially compromised component within the arc.

In some examples, highlighting the area within the arc of the circular area may include portraying a connection between the potentially compromised component and an additional component that is potentially involved with the potential security threat.

In some examples, arranging the components according to the domains may include: determining that a child component within the components communicates with multiple potential parent components and selecting a parent of the child component from the multiple potential parent components based at least in part on a volume of communication between the child component and the parent of the child component.

In one embodiment, each domain within the domains corresponds to a distinct function within the networked control system.

In one embodiment, each domain within the domains may include a parent component within the components and each descendent component of the parent component.

In some examples, arranging the components according to the control hierarchy may include (i) determining, for each component within the components, a component type of the component and (ii) placing the component at a predetermined distance from the center of the circular area based at least in part on the component type of the component.

In one embodiment, the computer-implemented method may further include receiving an input via the graphical interface directed at the potentially compromised component and providing, via the graphical interface and in response to the input, additional information describing the potentially compromised component and the potential security threat.

In one embodiment, the computer-implemented method may further include receiving an input via the graphical interface directed at a representation of a connection between the potentially compromised component and an additional component that is potentially involved with the potential security threat and providing, via the graphical interface and in response to the input, additional information describing the potential security threat as the potential security threat relates to the potentially compromised component and the additional component.

In one embodiment, a system for implementing the above-described method may include (i) a receiving module, stored in memory, that receives a request to provide a graphical interface to visualize a networked control system that includes a group of components, (ii) an identification module, stored in memory, that identifies within the networked control system at least one potential security threat involving at least one potentially compromised component of the networked control system, (iii) a providing module, stored in memory, that provides the graphical interface in response to the request by (a) ordering the components according to a control hierarchy, (b) portraying each component within the components within a circular area within the graphical interface, where representing each component within the circular area includes (A) arranging the components according to the control hierarchy such that, for each parent-child pair of components within the hierarchy, a parent component of the parent-child pair is placed closer to a center of the circular area than a child component of the parent-child pair and (B) arranging the components according to a group of domains within the networked control system such that each component falling within a given domain is placed within a corresponding arc of the circular area, and (c) highlighting, within the graphical interface, an area within an arc of the circular area containing the potentially compromised component based at least in part on identifying the potential security threat involving the potentially compromised component, and (iv) at least one physical processor configured to execute the receiving module, the identification module, and the providing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive a request to provide a graphical interface to visualize a networked control system that includes a group of components, (ii) identify within the networked control system at least one potential security threat involving at least one potentially compromised component of the networked control system, and (iii) provide the graphical interface in response to the request by (a) ordering the components according to a control hierarchy, (b) portraying each component within the components within a circular area within the graphical interface, where representing each component within the circular area includes (A) arranging the components according to the control hierarchy such that, for each parent-child pair of components within the hierarchy, a parent component of the parent-child pair is placed closer to a center of the circular area than a child component of the parent-child pair and (B) arranging the components according to a group of domains within the networked control system such that each component falling within a given domain is placed within a corresponding arc of the circular area, and (c) highlighting, within the graphical interface, an area within an arc of the circular area containing the potentially compromised component based at least in part on identifying the potential security threat involving the potentially compromised component.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
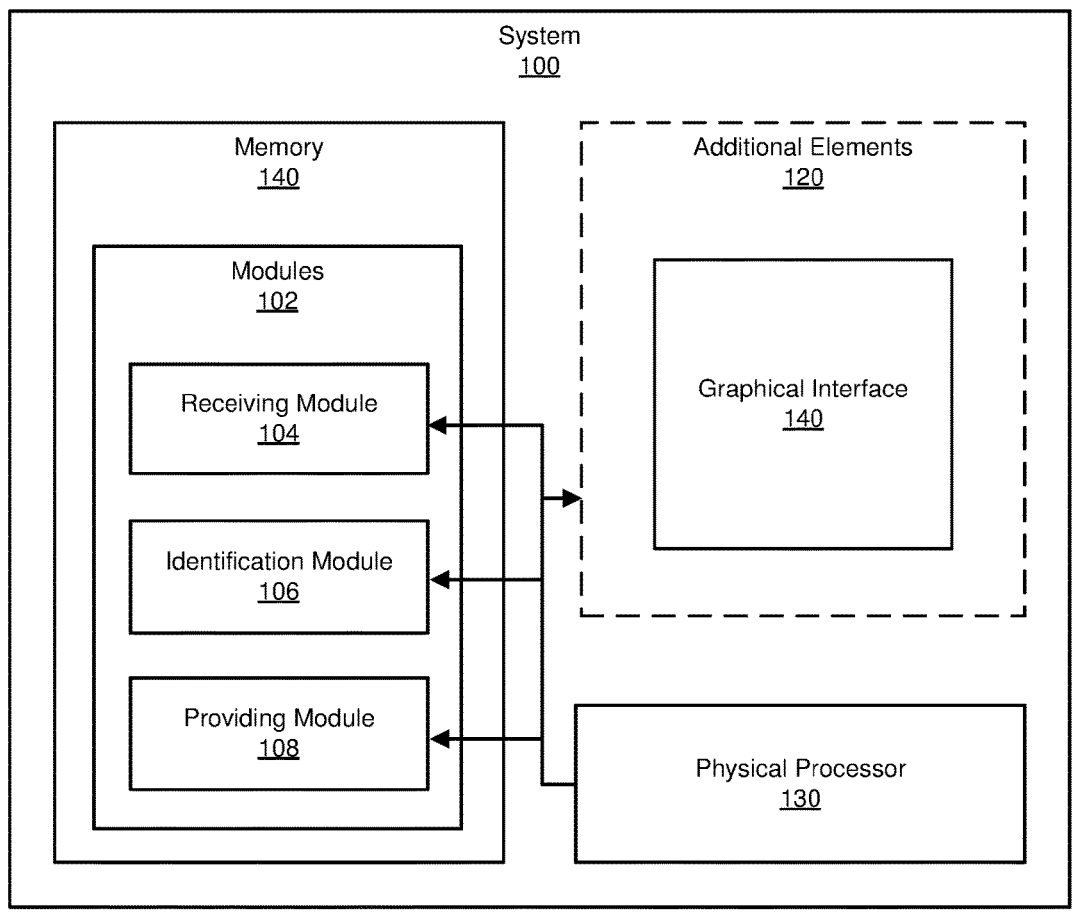
FIG. 1 is a block diagram of an example system for providing interfaces for visualizing threats within networked control systems.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for providing interfaces for visualizing threats within networked control systems. As will be explained in greater detail below, by presenting devices within control networks as radial hierarchies partitioned into distinct arcs and highlighting potentially malicious activity by highlighting devices, device connections, and/or compromised arcs, the systems and methods described herein may facilitate rapid understanding of and response to control system threats. In some examples, by visually defining partitioned hierarchies according to the volume of traffic between devices, the systems described herein may create effective representations of functional and/or physical divisions within control systems, thereby aiding the rapid investigation of specific processes and/or areas within the scope of the control system.

In addition, the systems and methods described herein may improve the functioning of a computing device in various ways. For example, the systems and methods described herein may improve the functioning of a control system monitoring device by improving the interface provided by the device. In addition, the systems and methods described herein may improve the functioning of a control system and/or one or more devices within the control system by facilitating the quick remediation of computing-based security threats to the control system and/or to devices within the control system. These systems and methods may also improve the field of computer security by providing interfaces for monitoring, investigating, and responding to computer security threats in real time.

Figure 2:
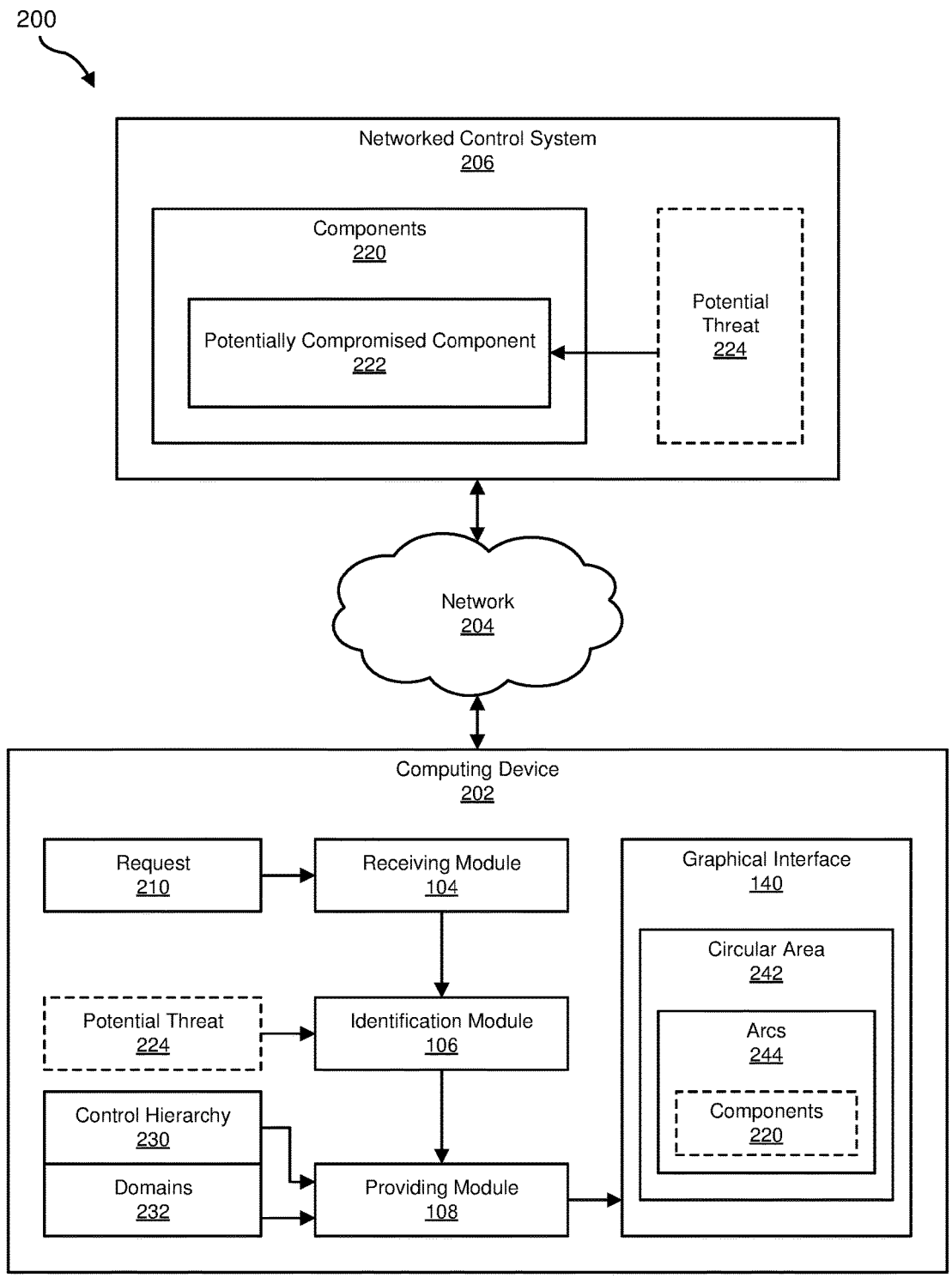
FIG. 2 is a block diagram of an additional example system for providing interfaces for visualizing threats within networked control systems.

The following will provide, with reference to FIGS. 1-2, detailed descriptions of example systems for providing interfaces for visualizing threats within networked control systems. Detailed descriptions of corresponding computer-implemented methods will also be provided in connection with FIG. 3. Detailed descriptions of example graphical interfaces for visualizing threats within networked control systems will be provided in connection with FIGS. 4-6. In addition, detailed descriptions of an example computing system and network architecture capable of implementing one or more of the embodiments described herein will be provided in connection with FIGS. 7 and 8, respectively.

FIG. 1 is a block diagram of exemplary system 100 for providing interfaces for visualizing threats within networked control systems. As illustrated in this figure, exemplary system 100 may include one or more modules 102 for performing one or more tasks. For example, and as will be explained in greater detail below, exemplary system 100 may include a receiving module 104 that receives a request to provide a graphical interface to visualize a networked control system that includes a plurality of components. Exemplary system 100 may additionally include an identification module 106 that identifies within the networked control system at least one potential security threat involving at least one potentially compromised component of the networked control system. Exemplary system 100 may also include a providing module 108 that provides the graphical interface in response to the request by (i) ordering the plurality of components according to a control hierarchy, (ii) portraying each component within the plurality of components within a circular area within the graphical interface, where representing each component within the circular area includes (a) arranging the plurality of components according to the control hierarchy such that, for each parent-child pair of components within the hierarchy, a parent component of the parent-child pair is placed closer to a center of the circular area than a child component of the parent-child pair and (b) arranging the plurality of components according to a plurality of domains within the networked control system such that each component falling within a given domain is placed within a corresponding arc of the circular area, and (iii) highlighting, within the graphical interface, an area within an arc of the circular area containing the potentially compromised component based at least in part on identifying the potential security threat involving the potentially compromised component. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or networked control system 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate providing interfaces for visualizing threats within networked control systems. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as a graphical interface 140. Graphical interface 140 generally represents any type or form of human-computer interface including, without limitation, a system for visualizing a group of networked devices.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a networked control system 206 via a network 204. In one example, all or a portion of the functionality of modules 102 may be performed by computing device 202, networked control system 206, and/or any other suitable computing system. As will be described in greater detail below, one or more of modules 102 from FIG. 1 may, when executed by at least one processor of computing device 202 and/or networked control system 206, enable computing device 202 and/or networked control system 206 to provide interfaces for visualizing threats within networked control system 206. For example, and as will be described in greater detail below, receiving module 104 may receive a request 210 to provide a graphical interface 140 to visualize networked control system 206 that includes components 220. Identification module 106 may identify within networked control system 206 at least one potential threat 224 involving at least one potentially compromised component 222 of networked control system 206. Providing module 108 may provide graphical interface 140 in response to request 210 by (a) ordering components 220 according to a control hierarchy 230, (b) portraying each component within components 220 within a circular area 242 within graphical interface 140, where representing each component within circular area 242 includes (A) arranging components 220 according to control hierarchy 230 such that, for each parent-child pair of components 220 within control hierarchy 230, a parent component of the parent-child pair is placed closer to the center of circular area 242 than a child component of the parent-child pair and (B) arranging components 220 according to domains 232 within networked control system 206 such that each component falling within a given domain is placed within a corresponding arc (e.g., of arcs 244) of circular area 242, and (c) highlighting, within graphical interface 140, an area within an arc of circular area 242 containing potentially compromised component 222 based at least in part on identifying potential threat 224 involving potentially compromised component 222.

Computing device 202 generally represents any type or form of computing device capable of reading computer-executable instructions. In one example, computing device 202 may represent an operator interface terminal of a networked control system. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Networked control system 206 generally represents any type or form of computing system that is capable of being exploited by a computing security threat. In one example, networked control system 206 may include one or more Supervisory Control and Data Acquisition ("SCADA") servers, Programmable Logic Controllers ("PLCs"), sensors, host systems, and/or networking devices. Additional examples of devices within networked control system 206 include, without limitation, security servers, application servers, web servers, storage servers, and/or database servers configured to run certain software applications and/or provide various security, web, storage, and/or database services. Although illustrated as a single entity in FIG. 2, networked control system 206 may include and/or represent a plurality of computing devices that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
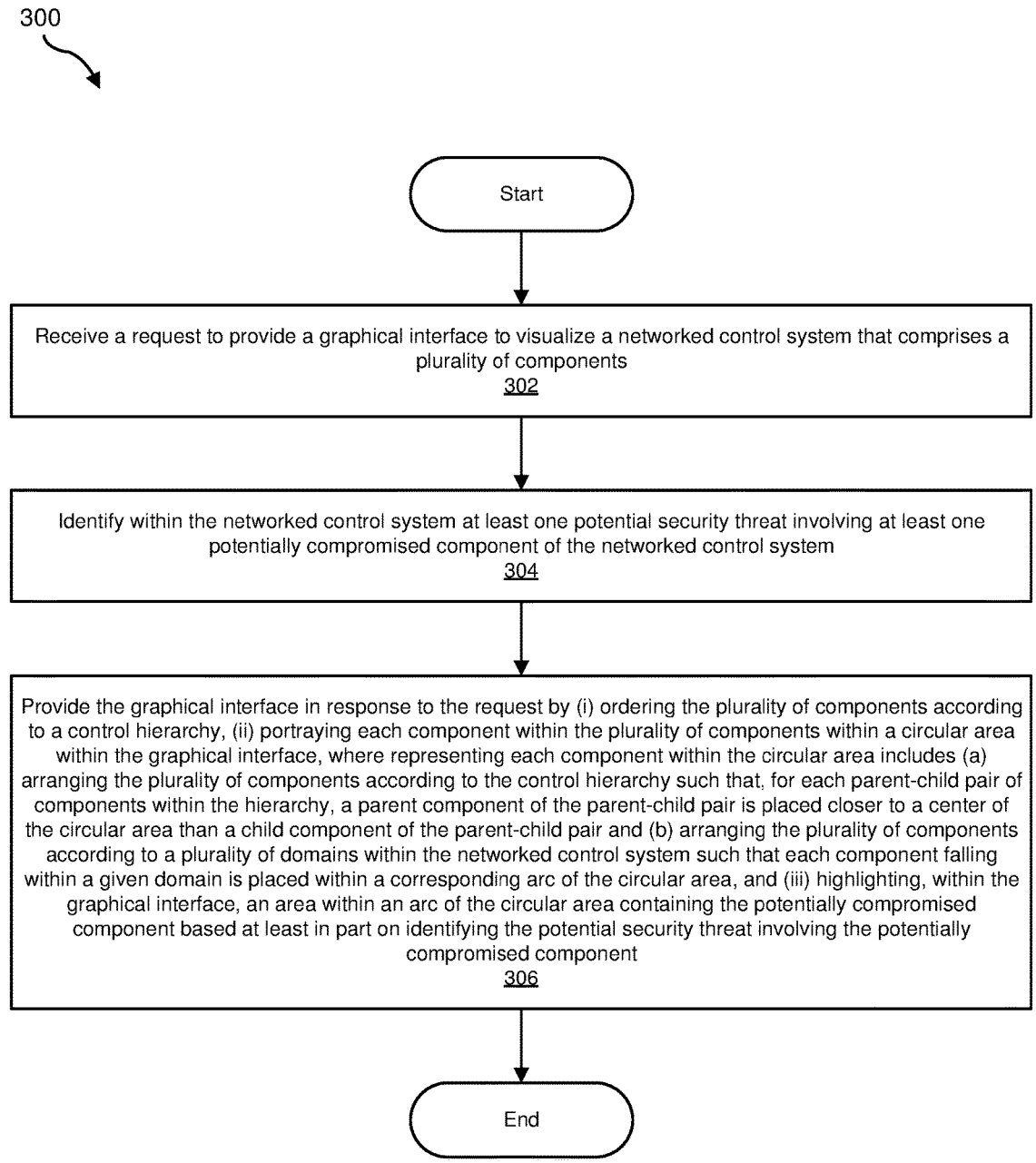
FIG. 3 is a flow diagram of an example method for providing interfaces for visualizing threats within networked control systems.

FIG. 3 is a flow diagram of an example computer-implemented method 300 for providing interfaces for visualizing threats within networked control systems. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive a request to provide a graphical interface to visualize a networked control system that may include a plurality of components. For example, receiving module 104 may, as part of computing device 202 in FIG. 2, receive request 210 to provide graphical interface 140 to visualize networked control system 206 that may include components 220.

The term "graphical interface," as used herein, may refer to any interface providing visual elements that may allow a user to interact with a computing system. In some examples, the graphical user interface may include an interface for an administration server and/or for a client system that communicates with an administration server. In some examples, the term "graphical interface" may refer to a human machine interface and/or a portion of a human machine interface. In some examples, the term "graphical interface" may refer to an interface to a networked control system.

The term "networked control system," as used herein, generally refers to any networked system of devices that directs and/or regulates one or more physical processes and/or systems. For example, a networked control system may regulate one or more industrial systems and/or processes (e.g., manufacturing, refining, power generation, etc.). Additionally or alternatively, a networked control system may regulate one or more infrastructure systems and/or processes (e.g., power distribution, water treatment and distribution, energy pipelines, etc.). In some examples, a networked control system may regulate one or more large facility systems and/or processes (e.g., large building systems, transportation hubs, etc.).

In some examples, the term "networked control system" may refer to an industrial control system (e.g., used for controlling industrial processes and/or systems). Additionally or alternatively, the term "networked control system" may refer to a SCADA system and/or to a Distributed Control System ("DCS"). In some examples, a networked control system may include sensors (e.g., for measuring one or more physical characteristics within a plant), final control elements (e.g., control valves, pumps, dampers, fans, etc.), PLCs and/or Remote Terminal Units ("RTUs") (e.g., for directly controlling one or more physical processes in real time, responsive to input from the sensors and/or direction from one or more supervisory systems), one or more supervisory servers (e.g., to provide higher-level direction to one or more control system devices, to collect and aggregate information from one or more control system devices, and/or to provide human interfaces for the networked control system).

In some examples, the networked control system may be a part of a larger networked control system. For example, the systems described herein may provide an interface for displaying threats within a single subnet that implements a networked control system that is a part of a greater networked control system. Thus, as will be discussed in examples below, a gateway device may represent a central device within the networked control system (e.g., by acting as a central device within the subnet that underlies that networked control system).

The term "component," as used herein, generally refers to any device, system, and/or subsystem within a networked control system that may be in communication (e.g., via a network) with one or more other components within the networked control system. Examples of components include, without limitation, SCADA servers, PLCs, sensors, computing devices (e.g., implementing a distributed control system), and networking devices (e.g., gateways).

Receiving module 104 may receive the request in any of a variety of contexts. For example, receiving module 104 may receive the request by receiving an instruction from a host system that is to provide the graphical interface. Additionally or alternatively, receiving module 104 may receive the request by receiving (e.g., at an endpoint system) a communication from a supervisory and/or administrative device connected to the networked control system. In some examples, receiving module 104 may receive the request via an input to a separate and/or previous graphical interface (e.g., the input directing the separate and/or previous graphical interface to bring up and/or navigate to the graphical interface). In some examples, receiving module 104 may receive the request from a security system in response to the security system identifying one or more potential threats and/or failures within the networked control system.

Returning to FIG. 3, at step 304, one or more of the systems described herein may identify within the networked control system at least one potential security threat involving at least one potentially compromised component of the networked control system. For example, identification module 106 may, as part of computing device 202 in FIG. 2, identify within networked control system 206 at least one potential threat 224 involving at least one potentially compromised component 222 of networked control system 206.

The term "security threat," as used herein, generally refers to any computing state that poses a security risk to a computing device and/or one or more devices, systems, and/or processes that interact with and/or are controlled by a computing device. Examples of security threats include, without limitation, malware, attempts to install malware, unauthorized use of computing resources and/or attempts at unauthorized use of computing resources, and/or unauthorized access to computing resources and/or attempts at unauthorized access to computing resources. In some examples, the security threat may include one or more computing failures (e.g., including failures unrelated to an attack) and/or vulnerabilities that may provide exposure to a computing attack, to additional computing failures, and/or to control system failures. Additionally or alternatively, the security threat may include one or more anomalies that may indicate the potential for unreliable performance and/or behavior by the networked control system and/or one or more components within the networked control system. In some examples, the security threat may include an attack on the networked control system (and/or one or more processes regulated by the networked control system) via one or more computing devices within the networked control system. Additionally or alternatively, the security threat may include an attack on one or more computing devices within the networked control system that may potentially have adverse effects on the networked control system and/or one or more processes regulated by the networked control system. In some examples, the security threat may include an attack targeting an industrial process, infrastructure, and/or a facility. In some examples, the security threat may include a denial of service attack (e.g., to block and/or harm the operations of one or more industrial, infrastructure, and/or facility processes). Additionally or alternatively, the security threat may include an infection to hijack a computing device for use in a botnet. In some examples, the security threat may include a targeted attack to control one or more devices within the networked control system to induce unauthorized behaviors from the networked control system and/or one or more of the processes and/or systems regulated by the networked control system. For example, the security threat may include a targeted attack to modify the parameters provided to one or more programmable logic controllers to sabotage a large-scale process regulated by the networked control system.

The term "compromised component," as used herein, generally refers to any component within a networked control system that may be involved in a security threat. For example, the term "compromised component" may refer to a component within a networked control system with a vulnerability that has successfully been exploited. Additionally or alternatively, the term "compromised component" may refer to a component is the target of an attack. In some examples, the term "compromised component" may refer to a component that has been leveraged to perform an attack. In some examples, the term "compromised component" may refer to a component that is vulnerable to an attack. Additionally or alternatively, the term "compromised component" may refer to a component whose ordinary operations may be ineffective due to a security failure. Accordingly, the term "potentially compromised component" may refer to a component that may have been compromised and/or that may become compromised.

Identification module 106 may identify the potential security threat in any of a variety of ways. For example, identification module 106 may identify the potential security threat by identifying malware within the networked control system (e.g., via a signature-based and/or heuristic scan of one or more computing devices within the networked control system). In some examples, identification module 106 may identify the potential security threat by identifying an intrusion within the networked control system. In some examples, identification module 106 may identify the potential security threat by identifying anomalous and/or suspicious behavior (e.g., exhibited by a device and/or between devices). Additionally or alternatively, identification module 106 may identify the potential security threat by identifying anomalous and/or suspicious network traffic. In some examples, identification module 106 may identify the potential security threat by identifying a failure within one or more devices of the networked control system. Additionally or alternatively, identification module 106 may identify the potential security threat by identifying a vulnerability within one or more devices of the networked control system. In some examples, identification module 106 may identify the potential security threat by identifying a failure of one or more processes and/or systems regulated by the networked control system.

Returning to FIG. 3, at step 306, one or more of the systems described herein may provide the graphical interface in response to the request by (i) ordering the plurality of components according to a control hierarchy, (ii) portraying each component within the plurality of components within a circular area within the graphical interface, where representing each component within the circular area may include (a) arranging the plurality of components according to the control hierarchy such that, for each parent-child pair of components within the hierarchy, a parent component of the parent-child pair is placed closer to a center of the circular area than a child component of the parent-child pair and (b) arranging the plurality of components according to a plurality of domains within the networked control system such that each component falling within a given domain is placed within a corresponding arc of the circular area, and (iii) highlighting, within the graphical interface, an area within an arc of the circular area containing the potentially compromised component based at least in part on identifying the potential security threat involving the potentially compromised component. For example, providing module 108 may, as part of computing device 202 in FIG. 2, provide graphical interface 140 in response to request 210 by (i) ordering components 220 according to control hierarchy 230, (ii) portraying each component within components 220 within circular area 242 within graphical interface 140, wherein representing each component within circular area 242 may include (a) arranging components 220 according to control hierarchy 230 such that, for each parent-child pair of components within control hierarchy 230, a parent component of the parent-child pair is placed closer to a center of circular area 242 than a child component of the parent-child pair and (b) arranging components 220 according to domains 232 within networked control system 206 such that each component falling within a given domain is placed within a corresponding arc (e.g., of arcs 244) of circular area 242, and (iii) highlighting, within graphical interface 140, an area within an arc of circular area 242 containing potentially compromised component 222 based at least in part on identifying potential threat 224 involving potentially compromised component 222.

The term "control hierarchy," as used herein, generally refers to any set of parent-child relationships between devices within a networked control system. A "parent-child relationship" as it relates to devices may refer to any relationship where a parent device regulates, manages, monitors, controls, and/or instructions a child device. For example, a PLC may act as a parent device to a sensor and as a child device to a SCADA server. In some examples, a gateway may be represented as a parent device to a group of SCADA servers (e.g., because the gateway may coordinate communications, including instructions, received by the SCADA servers).

The term "domain," as used herein, generally refers to any grouping of components within the networked control system by common characteristics. In one example, each domain within the plurality of domains may correspond to a distinct function within the networked control system. For example, distinct domains may represent different types of activities conducted within a large-scale system. As another example, distinct domains may represent activities conducted within different areas (which may or may not contain types of processes and/or systems in common) of a large-scale system. In some examples, each domain within the plurality of domains may include a parent component within the plurality of components and each descendent component of the parent component. For example, a domain may correspond to a SCADA server and each device under the direction (or, in some examples, principally under the direction) of the SCADA server.

Providing module 108 may provide the graphical interface in any suitable manner. For example, providing module 108 may control a display device to portray the networked control system. In some examples, providing module 108 may also receive input from one or more input devices to enable a user to navigate the graphical interface, change views within the graphical interface, request details through the graphical interface, and/or send instructions to one or more devices within the networked control system through the graphical interface.

In some examples, providing module 108 may arrange representations of the components in the networked control system within the graphical interface to enable an operator to quickly understand what specific functions, physical spaces, and/or devices are threatened and, thereby, may enable rapid and effective responses to security threats.

As discussed earlier, in some examples, providing module 108 may arrange the plurality of components according to the control hierarchy. For example, providing module 108 may determine, for each component within the plurality of components, a component type of the component and may place the component at a predetermined distance from the center of the circular area based at least in part on the component type of the component. For example, providing module 108 may place a portrayal of a gateway at the center of the circular area. Providing module 108 may also place portrayals of SCADA servers in a ring around the center of the circular area. Providing module 108 may further place portrayals of PLCs, sensors, and/or other computing systems (e.g., implementing distributed control systems) in wider rings around the ring of SCADA servers. In some examples, providing module 108 may determine the distance at which to place a component from the center of the circular area based at least in part on a volume of communication between the component and a parent component. For example, a parent component may be closer to the center of the circular area than the children of the parent component. However, some children of the parent component may be placed closer to the center of the circular area (and, therefore, closer to the parent component) based on a measure of how the parent component and those children components communicate. Thus, child components that communicate at a higher volume (and/or more recently) with the parent component may be placed closer to the center of the circular area than child components that communicate with the parent component at a lower volume.

In some examples, providing module 108 may arrange portrayals of the components according to the respective domains of the components. For example, as discussed earlier, the systems described herein may analyze the components within the context of the networked control system to arrange the components into sub-hierarchies. Thus, for example, providing module 108 may assign each device that operates under a supervisory system (e.g., a SCADA server) to a domain corresponding to the supervisory system. However, in some examples, some devices may communicate with multiple supervisory systems. Thus, in some examples, providing module 108 may determine that a child component within the plurality of components communicates with multiple potential parent components. In these examples, providing module 108 may select a parent of the child component from the multiple potential parent components based at least in part on a volume of communication between the child component and the parent of the child component. Because a high volume of communication between a lower-level device and a supervisory device may indicate a shared functional and/or regional domain, by mapping hierarchies at least partly according to the volume of communication between devices providing module 108 may create meaningful domains for visual representation. For example, a PLC may communicate with multiple SCADA servers. However, the PLC may communicate with one SCADA server frequently (e.g., at a frequency above a set threshold) and with some SCADA servers infrequently (e.g., at a frequency below the set threshold). Accordingly, providing module 108 may portray the PLC in the arc of the SCADA server with which the PLC communicates frequently. In some examples, the PLC may be portrayed in exactly one arc (the arc of the SCADA server with which the PLC communicates most frequently). In one example, the PLC may be portrayed in either zero or one arc, depending on whether communication between the PLC and the SCADA server with which the PLC communicates most frequently reaches a set threshold. In one example, the PLC may be portrayed in the arcs of all SCADA servers with which the PLC communicates frequently (e.g., according to a set threshold). In this example, the PLC may be portrayed multiple times within the circular area.

Figure 4:
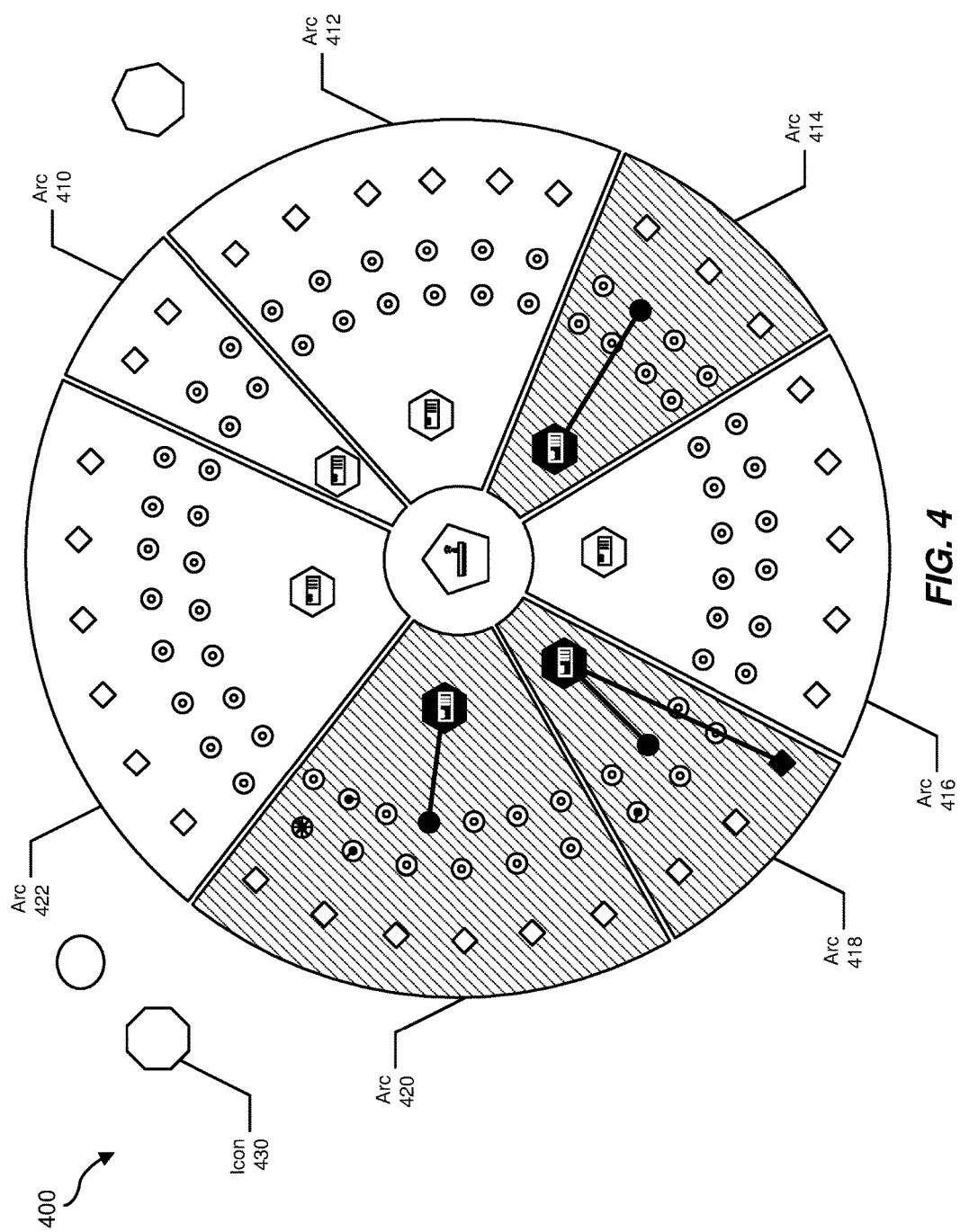
FIG. 4 is an illustration of an example graphical interface for visualizing threats within networked control systems.
Figure 5:
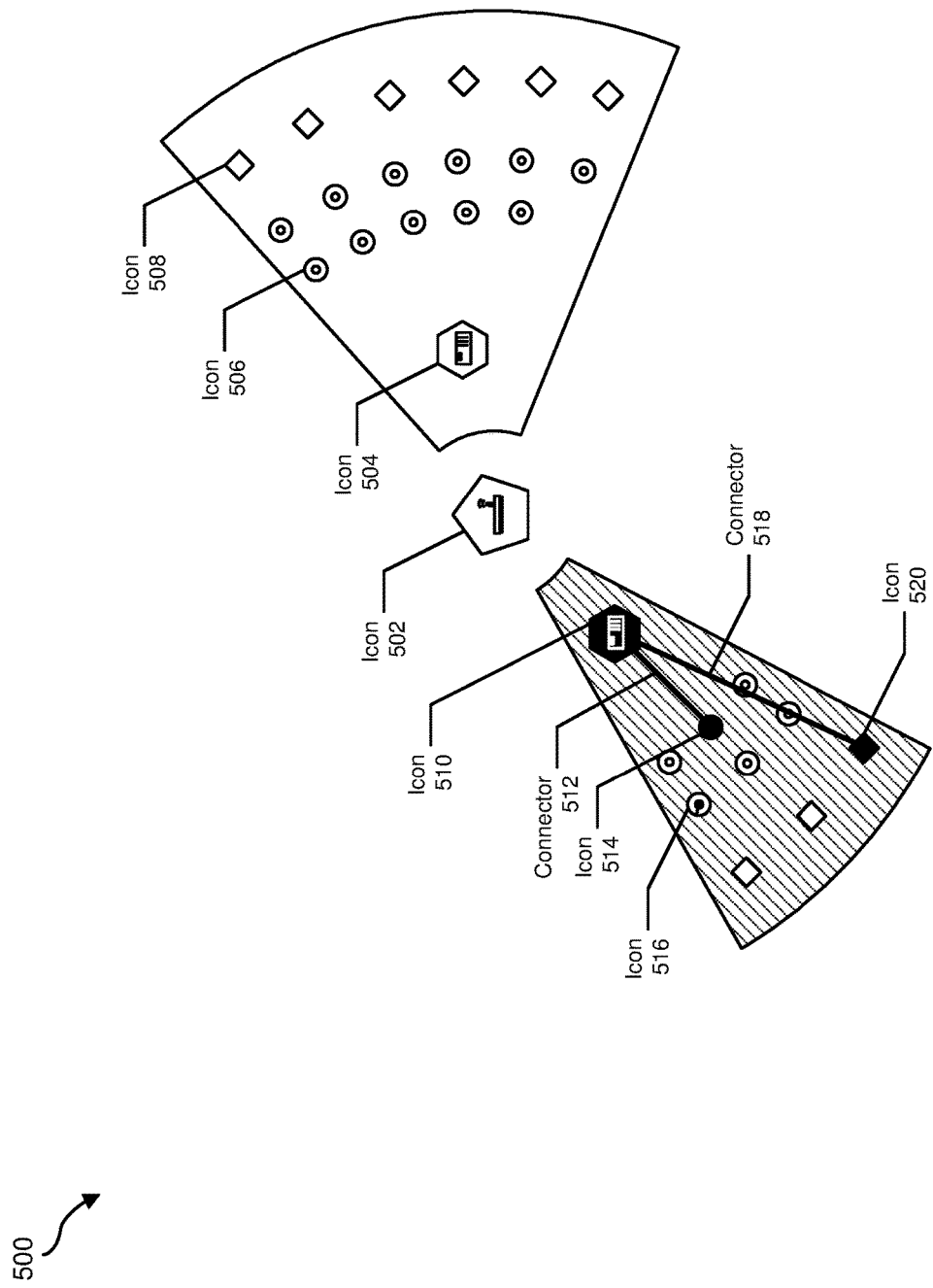
FIG. 5 is an illustration of an example graphical interface for visualizing threats within networked control systems.

FIGS. 4 and 5 may provide an illustration of the graphical interface provided by providing module 108. As shown in FIG. 4, a graphical interface 400 may show a circular area partitioned into arcs 410, 412, 414, 416, 418, 420, and 422. Graphical interface 400 may also show additional icons outside the circular area, such as an icon 430. In some examples, providing module 108 may portray components of different types within the networked control system with different icons. In some examples, the different icons may use different geometric shapes to represent different device types (e.g., a pentagon for a gateway, hexagons for SCADA servers, circles for PLCs and/or sensors, and diamonds for other computing systems (e.g., implementing distributed control systems)). Additionally or alternatively, providing module 108 may portray elements outside the networked control system (e.g., that may be in communication with a gateway of the networked control system) with various icons and/or geometric shapes. For example, icon 430 may represent the Internet, or another subnet of a broader networked control system, or a device on a private network. As can be seen in FIG. 4, different types of components may be placed at different radii (e.g., the gateway in the center, SCADA servers close to the center, PLCs and/or sensors further from the center, and other computing systems (e.g., implementing distributed control systems) even further from the center). Turning to FIG. 5, a view 500 of graphical interface 400 may show an icon 502 representing a gateway, an icon 504 representing a SCADA server, an icon 506 representing a PLC or a sensor, and an icon 508 representing a computing system.

In some examples, providing module 108 may highlight security threats within the networked control system by highlighting one or more portions of the graphical interface. For example, as discussed earlier, providing module 108 may highlight an arc (and/or an area within the arc) within the graphical interface that contains a component involved with a potential security threat. Providing module 108 may highlight the arc in any of a variety of ways. For example, providing module 108 may highlight the area within the arc of the circular area by highlighting the arc with a color (e.g., red). For example, providing module 108 may highlight the border of the arc with a color to portray the security threat. Additionally or alternatively, providing module 108 may highlight the background of the arc with a color to portray the security threat. In some examples, providing module 108 may tint the arc (e.g., including contents of the arc) with a color to portray the security threat. In some examples, providing module 108 may highlight the arc itself to portray a security threat to one or more components portrayed within the arc. Additionally or alternatively, providing module 108 may highlight the arc to portray a security threat to the domain represented by the arc.

In some examples, providing module 108 may highlight the area within the arc with a color by selecting the color based on a collective threat level within a domain of the control hierarchy corresponding to the arc. For example, providing module 108 may use a more intense and/or saturated color (e.g., a bright red) to represent a higher threat level and a less intense and/or saturated color (e.g., a pale red) to represent a lower threat level. In some examples, providing module 108 may portray the circular area with a three-dimensional (e.g., an isometric) view. For example, providing module 108 may portray one or more of the arcs as cylindrical slices (e.g., a portion of a cylinder where the cross section of the cylinder matches the circular area and the cross section of the cylinder matches the arc). In this example, providing module 108 may portray the height of each cylindrical slice according to a security threat level of the corresponding domain. For example, providing module 108 may portray domains with no threat level as flat arcs, domains with low threat levels as short cylindrical slices, domains with high threat levels as tall cylindrical slices, etc.

In some examples, providing module 108 may highlight the area within the arc of the circular area by highlighting a representation of the potentially compromised component within the arc. For example, providing module 108 may highlight an icon that represents the potentially compromised component and/or a border of the icon. For example, providing module 108 may highlight the icon by using a color that indicates a security threat (e.g., red) to portray the icon. In some examples, providing module 108 may highlight the icon by portraying the icon in a larger size, with bolder lines, and/or with auxiliary accompanying icons.

In some examples, providing module 108 may highlight the area within the arc of the circular area by portraying a connection between the potentially compromised component and an additional component that is potentially involved with the potential security threat. For example, providing module 108 may draw a line (or other visual connector) between the potentially compromised component and the additional component. In some examples, providing module 108 may portray a connection where a communication that may relate to the potential security threat is observed between the potentially compromised component and the additional component. For example, one or more of the systems described herein may observe the potentially compromised component communicating with the additional component and therefore suspect the communication of representing a security threat. In some examples, one or more of the systems described herein may observe an anomalous communication between the potentially compromised component and the additional component and therefore suspect the communication of representing a security threat. In some examples, one or more of the systems described herein may trace an anomalous behavior of a child system back to an instruction from a parent system and therefore portray a connection between the components.

FIGS. 4 and 5 may provide examples of portraying security threats in the graphical interface. As shown in FIG. 4, arcs 410, 412, 416, and 422 may show no security threats. However, arcs 414, 418, and 420 may show security threats in various ways. For example, providing module 108 may highlight arcs 414, 418, and 420 (e.g., with an intense color, such as red). In some examples, providing module 108 may highlight arcs 414, 418, and 420 with differing levels of intensity. For example, a domain corresponding to arc 420 may bear the greatest security threat and, therefore, arc 420 may be highlighted to a corresponding degree (e.g., a red with high color intensity). A domain corresponding to arc 414 may bear the lowest security threat (i.e., that passes a threshold to be represented as bearing a security threat) and, therefore, arc 414 may be highlighted to a corresponding degree (e.g., a red with low color intensity). A domain corresponding to arc 418 may bear a moderate security threat and, therefore, arc 418 may be highlighted to a corresponding degree (e.g., a red with moderate color intensity).

As shown in FIG. 5, providing module 108 may portray the icons in arc 412 (including icons 504, 506, and 508) as in a normal state. However, providing module 108 may portray icons 510, 514, 516, and 520 in arc 418 as being associated with one or more security threats. Thus, providing module 108 may highlight icons 510, 512, 514, and 520 (e.g., with a different color, such as red). In addition, providing module 108 may portray an anomalous association between the SCADA server represented by icon 510 and the PLC portrayed by icon 514 with a connector 512. Likewise, providing module 108 may portray an anomalous association between the SCADA server represented by icon 510 and the computing system represented by icon 520 with a connector 518. Furthermore, providing module 108 may portray an anomalous behavior observed in connection with icon 516 by highlighting icon 516 and/or drawing an internal line from the center of icon 516. For example, icon 516 may represent a PLC in communication with a group of sensors. In one example, the internal line from the center of icon 516 may represent an anomalous, faulty, and/or malicious connection between the PLC and one of the sensors in the group of sensors. In one example, the internal line from the center of icon 516 may represent a connection to another device that is not portrayed within the circular area, that is not portrayed on screen, and/or that is portrayed in a location where drawing a full connector between icon 516 and the additional device would obscure the representation of the networked control system (e.g., because the distance of the connection and/or the number of icons that would be overdrawn by the connection would exceed a predetermined threshold).

In some examples, providing module 108 may also receive inputs via the graphical interface. For example, providing module 108 may receive an input via the graphical interface directed at the potentially compromised component and provide, via the graphical interface and in response to the input, additional information describing the potentially compromised component and the potential security threat. For example, providing module 108 may create an interface element listing one or more anomalous behaviors observed in connection with the potentially compromised component and/or indicate one or more risks associated with the potentially compromised component.

In one example, providing module 108 may receive an input via the graphical interface directed at a representation of a connection between the potentially compromised component and an additional component that is potentially involved with the potential security threat. In these examples, providing module 108 may provide, via the graphical interface and in response to the input, additional information describing the potential security threat as the potential security threat relates to the potentially compromised component and the additional component. For example, providing module 108 may create an interface element listing one or more anomalous communications observed between the potentially compromised component and the additional component and/or indicate one or more risks associated with the connection between potentially compromised component and the additional component.

Figure 6:
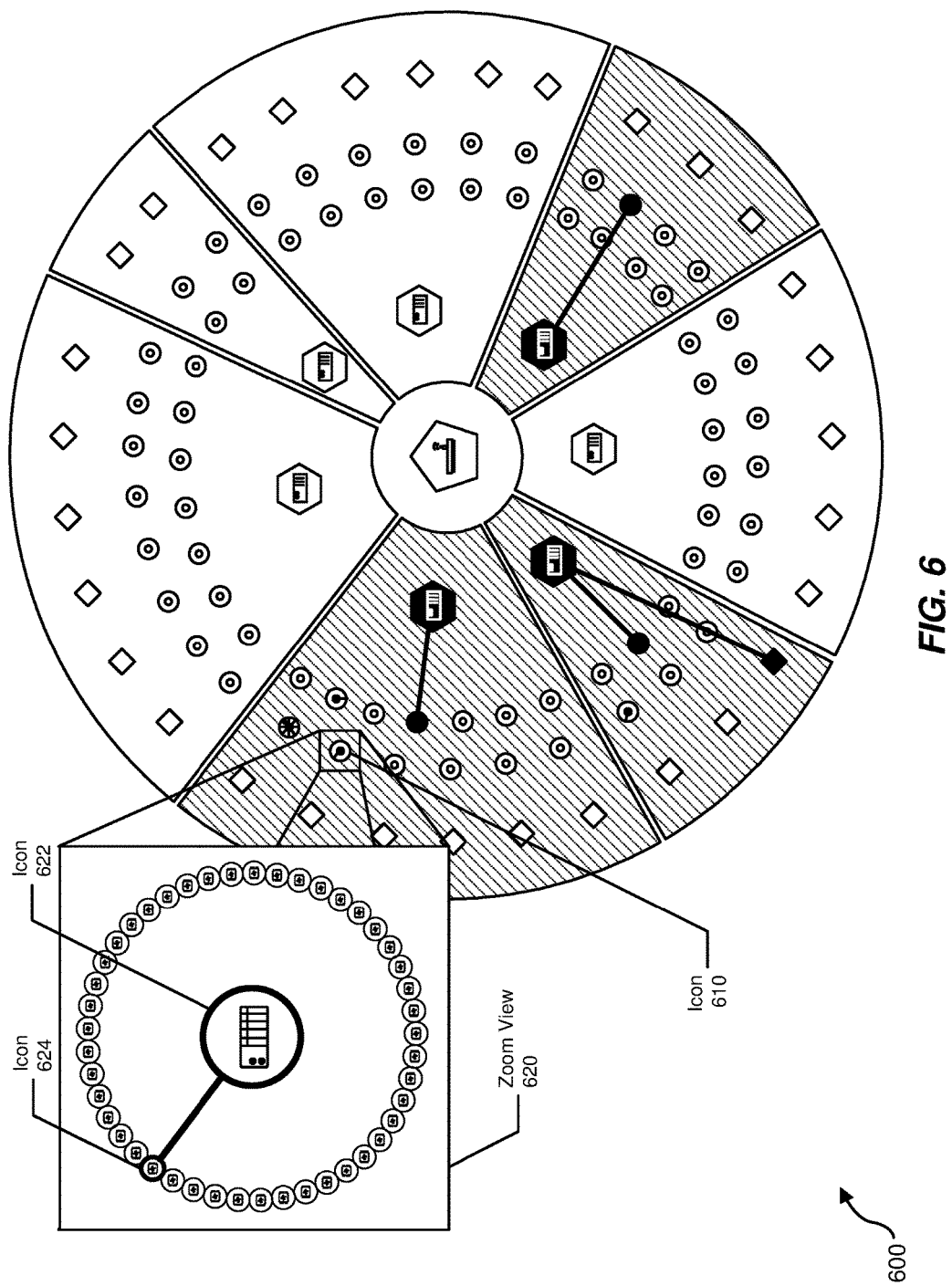
FIG. 6 is an illustration of an example graphical interface for visualizing threats within networked control systems.

In some examples, providing module 108 may receive an input via the graphical interface directed at zooming in on an element within the graphical interface. For example, in some examples one or more of the components portrayed within the circular area may include a sub-hierarchy within the control hierarchy. For examples, a component (e.g., a PLC) may be portrayed as at the center of a smaller circular area and child components (e.g., sensors) may be portrayed radially around the component. Accordingly, in some examples, the sub-hierarchy (e.g., in a zoomed in view) may be portrayed using one or more of the techniques described herein for portraying the networked control system. FIG. 6 illustrates an example view 600 of the graphical interface. As shown in FIG. 6, view 600 may include a zoom view 620 of an icon 610. In zoom view 620, icon 610 may be revealed in greater detail by an icon 622 (e.g., representing a PLC) and surrounding icons representing sensors in communication with the PLC, including an icon 624. In one example, the systems described herein may portray a suspicious connection between the PLC represented by icon 622 and the sensor represented by icon 624. Thus, through interaction with the graphical interface, providing module 108 may provide detailed views of lower levels of a control hierarchy by providing a radial representation of a sub-hierarchy.

In some examples, providing module 108 may receive an input via the graphical interface to remediate one or more security threats represented within the graphical interface. For example, providing module 108 may receive an input to quarantine one or more affected components and/or domains, to take one or more affected components and/or domains offline, to switch to one or more backup control systems and/or control system components, and/or to implement control system parameters for emergency situations.

As explained above in connection with FIG. 3, a visualization may begin with a gateway and may be surrounded by SCADA servers, PLCs, sensors, computing systems, and/or Distributed Control Systems. The various assets may be delineated by geometric shapes. Assets may be grouped by servers and the health of the network region may be highlighted by a contrasting background color. Security warnings and/or anomalous behaviors between asset pairs may be highlighted in manner that is clear from a zoomed out and a zoomed in view. Secure states or baseline behavior may be represented in asset connections during navigation within the topology. In some examples, a user may select alternative isometric and three-dimensional views that may further illustrate network health.

In some examples, the threat visualization interface may define subset areas based on the volume of traffic. This organization of information may be beneficial because the asset communication in certain environments, such as Industrial Control Systems, may map to many functional operations in a network and physical space. This information may better equip operators to identify what specific plant operation is threatened and to rapidly investigate the specific asset and region of the plant floor. The threat visualization interface may use a clear organization and division of assets where regions of threats and individual threats are highlighted for rapid response. This model may be beneficial in facilitating efficient understanding and a focus on remediation when network and critical infrastructure are threatened.

Figure 7:
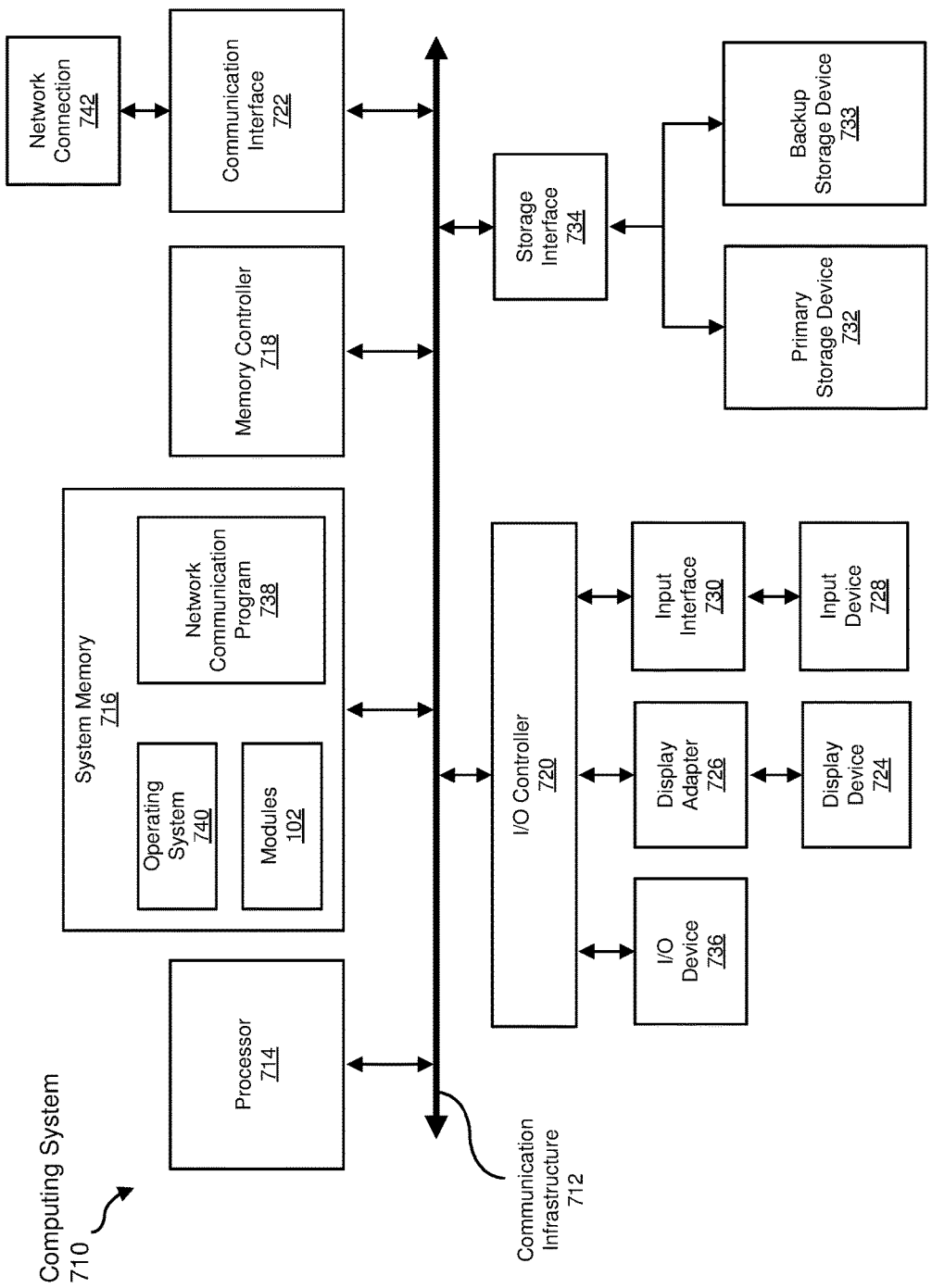
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
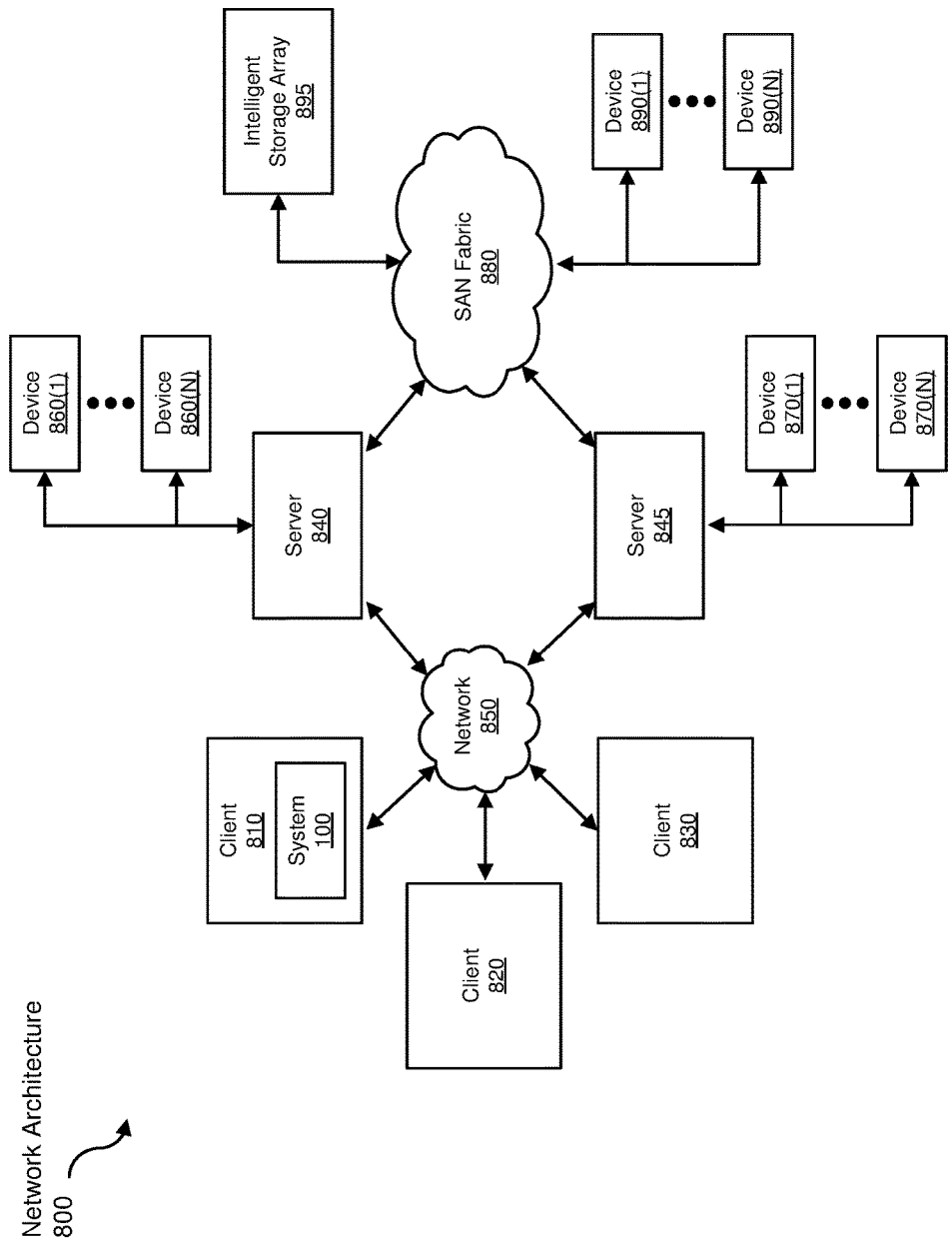
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for providing interfaces for visualizing threats within networked control systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive networked control system behavioral data to be transformed, transform the behavioral data to a visualization, output a result of the transformation to a display device, use the result of the transformation to provide security alerts, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for providing interfaces for visualizing threats within networked control systems, at least a portion of the method being performed by a computing device comprising at least one processor, the method comprising:
    receiving a request to provide a graphical interface to visualize a networked control system that comprises a plurality of components;
    identifying within the networked control system at least one potential security threat involving at least one potentially compromised component of the networked control system;
    providing the graphical interface in response to the request by:
        ordering the plurality of components according to a control hierarchy;
        portraying each component within the plurality of components within a circular area within the graphical interface, wherein representing each component within the circular area comprises:
            arranging the plurality of components according to the control hierarchy such that, for each parent-child pair of components within the hierarchy, a parent component of the parent-child pair is placed closer to a center of the circular area than a child component of the parent-child pair, wherein the control hierarchy is based on a relationship between the parent component of the parent-child pair and the child component of the parent-child pair; and
            arranging the plurality of components according to a plurality of domains within the networked control system such that each component falling within a given domain is placed within a corresponding arc of the circular area; and
        highlighting, within the graphical interface, an area within an arc of the circular area containing the potentially compromised component based at least in part on identifying the potential security threat involving the potentially compromised component.

2. The computer-implemented method of claim 1, wherein highlighting the area within the arc of the circular area comprises highlighting the arc with a color.

3. The computer-implemented method of claim 2, wherein highlighting the area within the arc with a color comprises selecting the color based on a collective threat level within a domain of the control hierarchy corresponding to the arc.

4. The computer-implemented method of claim 1, wherein highlighting the area within the arc of the circular area comprises highlighting a representation of the potentially compromised component within the arc.

5. The computer-implemented method of claim 1, wherein highlighting the area within the arc of the circular area comprises portraying a connection between the potentially compromised component and an additional component that is potentially involved with the potential security threat.

6. The computer-implemented method of claim 1, wherein arranging the plurality of components according to the plurality of domains comprises:
    determining that a child component within the plurality of components communicates with multiple potential parent components; and
    selecting a parent of the child component from the multiple potential parent components based at least in part on a volume of communication between the child component and the parent of the child component.

7. The computer-implemented method of claim 1, wherein each domain within the plurality of domains corresponds to a distinct function within the networked control system.

8. The computer-implemented method of claim 1, wherein each domain within the plurality of domains comprises a parent component within the plurality of components and each descendent component of the parent component.

9. The computer-implemented method of claim 1, wherein arranging the plurality of components according to the control hierarchy comprises:
determining, for each component within the plurality of components, a component type of the component; and
placing the component at a predetermined distance from the center of the circular area based at least in part on the component type of the component.

10. The computer-implemented method of claim 1, further comprising:
receiving an input via the graphical interface directed at the potentially compromised component;
providing, via the graphical interface and in response to the input, additional information describing the potentially compromised component and the potential security threat.

11. The computer-implemented method of claim 1, further comprising:
receiving an input via the graphical interface directed at a representation of a connection between the potentially compromised component and an additional component that is potentially involved with the potential security threat;
providing, via the graphical interface and in response to the input, additional information describing the potential security threat as the potential security threat relates to the potentially compromised component and the additional component.

12. A system for providing interfaces for visualizing threats within networked control systems, the system comprising:
a receiving module, stored in memory, that receives a request to provide a graphical interface to visualize a networked control system that comprises a plurality of components;
an identification module, stored in memory, that identifies within the networked control system at least one potential security threat involving at least one potentially compromised component of the networked control system;
a providing module, stored in memory, that provides the graphical interface in response to the request by:
ordering the plurality of components according to a control hierarchy;
portraying each component within the plurality of components within a circular area within the graphical interface, wherein representing each component within the circular area comprises:
arranging the plurality of components according to the control hierarchy such that, for each parent-child pair of components within the hierarchy, a parent component of the parent-child pair is placed closer to a center of the circular area than a child component of the parent-child pair, wherein the control hierarchy is based on a relationship between the parent component of the parent-child pair and the child component of the parent-child pair; and
arranging the plurality of components according to a plurality of domains within the networked control system such that each component falling within a given domain is placed within a corresponding arc of the circular area; and
highlighting, within the graphical interface, an area within an arc of the circular area containing the potentially compromised component based at least in part on identifying the potential security threat involving the potentially compromised component; and
at least one physical processor configured to execute the receiving module, the identification module, and the providing module.

13. The system of claim 12, wherein the providing module highlights the area within the arc of the circular area by highlighting the arc with a color.

14. The system of claim 13, wherein the providing module highlights the area within the arc with a color by selecting the color based on a collective threat level within a domain of the control hierarchy corresponding to the arc.

15. The system of claim 12, wherein the providing module highlights the area within the arc of the circular area by highlighting a representation of the potentially compromised component within the arc.

16. The system of claim 12, wherein the providing module highlights the area within the arc of the circular area by portraying a connection between the potentially compromised component and an additional component that is potentially involved with the potential security threat.

17. The system of claim 12, wherein the providing module arranges the plurality of components according to the plurality of domains by:
determining that a child component within the plurality of components communicates with multiple potential parent components; and
selecting a parent of the child component from the multiple potential parent components based at least in part on a volume of communication between the child component and the parent of the child component.

18. The system of claim 12, wherein each domain within the plurality of domains corresponds to a distinct function within the networked control system.

19. The system of claim 12, wherein each domain within the plurality of domains comprises a parent component within the plurality of components and each descendent component of the parent component.

20. A non-transitory computer-readable medium comprising one or more computer-readable instructions that, when executed by at least one processor of a computing device, cause the computing device to:
receive a request to provide a graphical interface to visualize a networked control system that comprises a plurality of components;
identify within the networked control system at least one potential security threat involving at least one potentially compromised component of the networked control system;
provide the graphical interface in response to the request by:
ordering the plurality of components according to a control hierarchy;
portraying each component within the plurality of components within a circular area within the graphical interface, wherein representing each component within the circular area comprises:

arranging the plurality of components according to the control hierarchy such that, for each parent-child pair of components within the hierarchy, a parent component of the parent-child pair is placed closer to a center of the circular area than a child component of the parent-child pair, wherein the control hierarchy is based on a relationship between the parent component of the parent-child pair and the child component of the parent-child pair; and arranging the plurality of components according to a plurality of domains within the networked control system such that each component falling within a given domain is placed within a corresponding arc of the circular area; and highlighting, within the graphical interface, an area within an arc of the circular area containing the potentially compromised component based at least in part on identifying the potential security threat involving the potentially compromised component.

* * * * *